United States Patent
Bishop et al.

(10) Patent No.: US 12,436,348 B2
(45) Date of Patent: Oct. 7, 2025

(54) OPTICAL FIBER MANAGEMENT ASSEMBLY

(71) Applicant: COMMSCOPE TECHNOLOGIES LLC, Hickory, NC (US)

(72) Inventors: Erik David Bishop, Fuquay-Varina, NC (US); Harry L. Vaswani, Garner, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 492 days.

(21) Appl. No.: 17/633,773

(22) PCT Filed: Aug. 7, 2020

(86) PCT No.: PCT/US2020/045473
§ 371 (c)(1),
(2) Date: Feb. 8, 2022

(87) PCT Pub. No.: WO2021/026486
PCT Pub. Date: Feb. 11, 2021

(65) Prior Publication Data
US 2022/0276456 A1  Sep. 1, 2022

Related U.S. Application Data

(60) Provisional application No. 62/884,300, filed on Aug. 8, 2019.

(51) Int. Cl.
*G02B 6/44* (2006.01)

(52) U.S. Cl.
CPC ....... *G02B 6/4446* (2013.01); *G02B 6/44515* (2023.05); *G02B 6/44528* (2023.05); *G02B 6/4454* (2013.01)

(58) Field of Classification Search
CPC  G02B 6/4454; G02B 6/4446; G02B 6/44528; G02B 6/44515
See application file for complete search history.

(56) References Cited

U.S. PATENT DOCUMENTS

| 5,956,449 A | 9/1999 | Otani et al. |
| 7,397,997 B2 | 7/2008 | Mertesdorf et al. |
| 7,844,158 B2 | 11/2010 | Gronvall et al. |

(Continued)

FOREIGN PATENT DOCUMENTS

| WO | 2008/118603 A2 | 10/2008 |
| WO | 2018/085767 A1 | 5/2018 |

(Continued)

OTHER PUBLICATIONS

International Search Report and Written Opinion of the International Searching Authority for International Patent Application No. PCT/US2020/045473 mailed Nov. 23, 2020, 11 pages.

*Primary Examiner* — Michael P Mooney
(74) *Attorney, Agent, or Firm* — Merchant & Gould P.C.

(57) ABSTRACT

Aspects of the present disclosure relates to an optical fiber management assembly that has optical fiber management, storing functionality, and optionally splicing functionality all on one apparatus. Various types of splicing can be used to splice single fibers or multi-fibers, for example, mechanical splices, fusion splices, etc.

19 Claims, 6 Drawing Sheets

(56) References Cited

U.S. PATENT DOCUMENTS

| | | | |
|---|---|---|---|
| 2007/0104447 A1* | 5/2007 | Allen | G02B 6/4454 |
| | | | 385/135 |
| 2008/0310811 A1 | 12/2008 | Gonzales et al. | |
| 2013/0004122 A1 | 1/2013 | Kingsbury | |
| 2019/0101716 A1* | 4/2019 | Claessens | G02B 6/44528 |

FOREIGN PATENT DOCUMENTS

| | | |
|---|---|---|
| WO | 2018/231833 A1 | 12/2018 |
| WO | 2019/040742 A1 | 2/2019 |
| WO | 2019/195602 A1 | 10/2019 |
| WO | 2020/180619 A1 | 9/2020 |
| WO | 2020/180714 A1 | 9/2020 |
| WO | 2020/205313 A1 | 10/2020 |

* cited by examiner

OPTICAL FIBER MANAGEMENT ASSEMBLY

CROSS-REFERENCE TO RELATED APPLICATION

This application is a National Stage Patent Application of PCT/US2020/045473, filed on Aug. 7, 2020, which claims the benefit of U.S. Patent Application Ser. No. 62/884,300, filed on Aug. 8, 2019, the disclosures of which are incorporated herein by reference in their entireties. To the extent appropriate, a claim of priority is made to each of the above disclosed applications.

TECHNICAL FIELD

The present disclosure relates generally to telecommunications management devices. More specifically, the present disclosure relates to fiber management devices and systems for managing optical fibers.

BACKGROUND

Various modules are commonly used to manage, store and protect optical fibers and optical splices. Typically, these modules include trays that have relatively hard, plastic constructions and include added structures for routing optical fibers and splicing locations. There is a need for systems and devices for managing and storing optical fibers with ease.

SUMMARY

Certain aspects of the present disclosure relate to a fiber management device or system for facilitating routing and storing optical fibers.

Aspects of the present disclosure relates to an optical fiber management assembly that has optical fiber management, storing functionality, and optionally splicing functionality all on one apparatus. Various types of splicing can be used to splice single fibers or multi-fibers, for example, mechanical splices, fusion splices, etc.

The optical fiber management assembly provides a routing path for routing optical fibers and can accommodate fibers that are in a multi-fiber (e.g., ribbon) configuration or a single fiber configuration. The optical fiber management assembly in accordance with the present disclosure can have the benefit of fiber routing, splice mounting functionality, and storing fibers or pigtails all in one optical fiber management assembly without any additional parts.

Another aspect of the present disclosure relates to an optical fiber management assembly. The optical fiber management assembly may include a first panel; a second panel; a third panel; a first hinge location disposed between the first panel and the second panel; and a second hinge location disposed between the second panel and the third panel. The optical fiber management assembly may be configured to be foldable at the first hinge location in a first direction and configured to be foldable at the second hinge location in a second direction that is opposite to the first direction.

A further aspect of the present disclosure relates to a telecommunications enclosure. The telecommunications enclosure may include a housing; a plurality of ruggedized fiber optic adapters secured to the housing. The ruggedized fiber optic adapters may include hardened connector ports accessible from outside the housing and non-hardened connector ports accessible from inside the housing. The telecommunications enclosure may also include an optical fiber management assembly. The optical fiber management assembly may include a plurality of panels and at least one hinge location disposed between the plurality of panels. The optical fiber management assembly may be configured to be foldable at the at least one hinge location.

The various aspects characterized above in this section can be used together or separately in enclosure arrangements.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The above specification, examples and data provide a complete description of the manufacture and use of the composition of the invention. Since many embodiments of the invention can be made without departing from the spirit and scope of the invention, the invention resides in the claims hereinafter appended.

The present disclosure is directed generally to an optical fiber management assembly. The optical fiber management assembly provides a number of advantages, which will be discussed in further detail below. For example, no additional features or supports are needed for providing optical fiber management and storage on the optical fiber management assembly. The optical fiber management assembly may be installed in a factory sealed enclosure such as a MST.

In certain examples, the optical fiber management assembly of the present disclosure provides loose fiber routing functionality, storage functionality, and splice mounting capability configured all in one assembly. In certain examples, the optical fibers can be terminated by a fiber optic connector or fiber optic connectors. Non-limiting examples of connectors include MPO style connectors, and single or duplex fiber connectors, such as LC or SC type connectors.

The optical fiber management assembly can include one or more (typically, multiple) optical fibers attached thereon and supported by a substrate, such as a sleeve or foldable envelope. In certain examples, the optical fibers can be stored or arranged in a coil or loop of optical fiber that is removable/detachable from the substrate.

Figure 1:
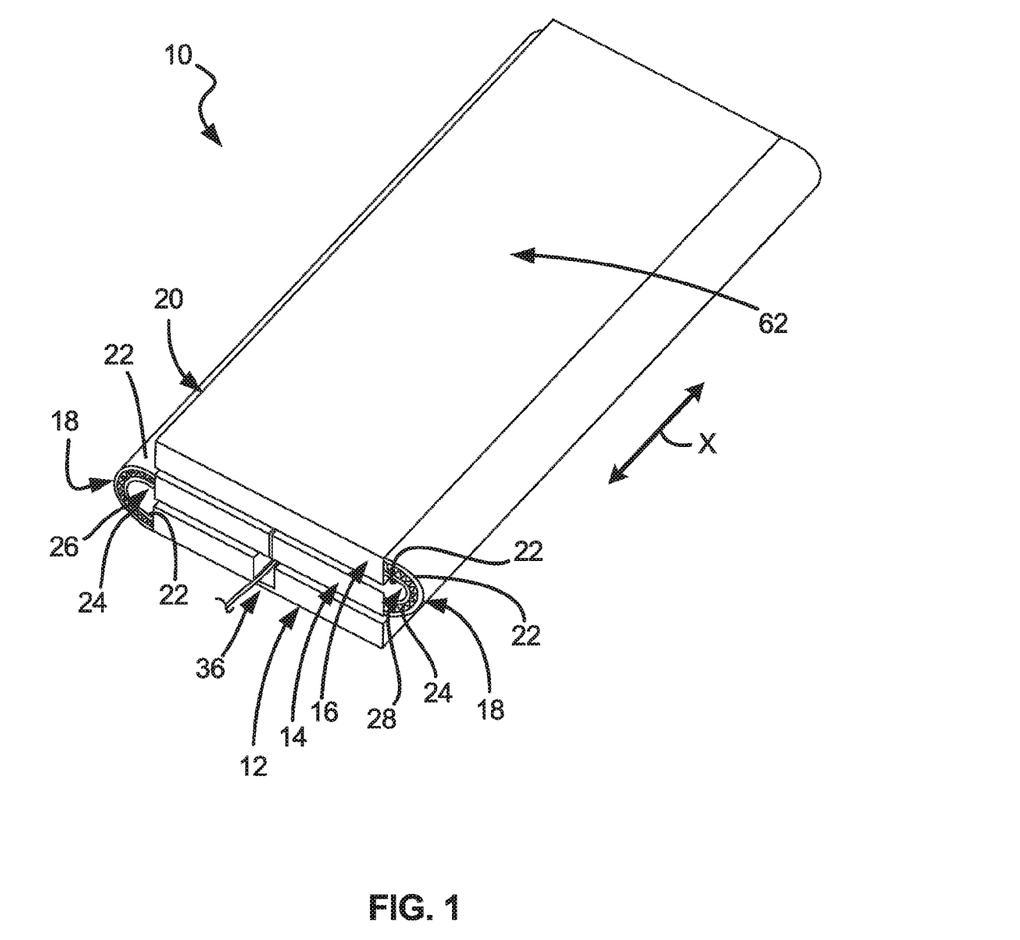
FIG. 1 is a schematic perspective view of an optical fiber management assembly in a collapsed state in accordance with principles of the present disclosure.

FIG. 1 is a schematic perspective view of an example optical fiber management assembly 10 shown in a first state (e.g., closed position, folded position, compact configuration) in accordance with the present disclosure. The optical fiber management assembly 10 is a multi-layer substrate that can include: a first substrate layer 12 (e.g., first panel), a second substrate layer 14 (e.g., second panel), and a third substrate layer 16 (e.g., third panel), although alternatives are possible. In certain examples, the optical fiber management assembly 10 may include three or more substrate layers. The first, second, and third substrate layers 12, 14, 16 may be fabricated from a foam material. The foam material is preferably fabricated from a polyurethane type packing open cell foam. The foam substrate layers are preferably die-cut to allow any number of geometric configurations to be created to meet routing, splicing, and storage requirements. In the example depicted, the first, second, and third substrate layers 12, 14, 16 are rectangular in shape, although alternatives are possible. In certain examples, the first, second, and third substrate layers 12, 14, 16 may be fabricated from a paperboard material or a cardboard material, although alternatives are possible.

The first, second, and third substrate layers 12, 14, 16 may be connected together via first and second radius limiting hinge members 18, 20 (e.g., first and second hinge locations). The first and second radius limiting hinge members 18, 20 may include opposing films 22 and strips 24 sandwiched therebetween. The strips 24 can provide strength and reinforcement to help prevent the first and second radius limiting hinge members 18, 20 from collapsing when the optical fiber management assembly 10 is folded. In certain examples, the films 22 can be made from a plastic material. In other examples, the films 22 may be a laminate material. The strips 24 are preferably formed of a nonmetallic material, such as cardboard or the like, although alternatives are possible. It will be appreciated that other materials may be used to help provide the first and second radius limiting hinge members 18, 20 with strength. In certain examples, the films 22 may be a flexible film layer. The strips 24 may be bonded to the films 22 using, for example, an adhesive material. The strips 24 may be positioned in a lengthwise direction or x-direction. The first, second, and third substrate layers 12, 14, 16 can be folded as described at the first and second radius limiting hinge members 18, 20 to create a pocket/sleeve-like space, passageway or channel 26, 28 to store, route, manage loose optical fiber or to run optical fiber from one substrate layer to the next. That is, optical fibers may be routed parallel to the first and second radius limiting hinge members 18, 20 to prevent any kinks or bends. The first and second radius limiting hinge members 18, 20 help to protect optical fibers from being pinched as the optical fibers are routed between the first, second, and third substrate layers 12, 14, 16.

The first radius limiting hinge member 18 may be adapted to connect the first and second substrate layers 12, 14 together to allow the first and second substrate layers 12, 14 to be folded adjacent one another. The second radius limiting hinge member 20 may be adapted to connect the second and third radius limiting hinge members 14, 16 together to allow the second and third substrate layers 14, 16 to be folded adjacent one other. The second substrate layer 14 can be positioned between the first and third substrate layers 12, 16. That is, the first, second, and third substrate layers 12, 14, 16 can be foldably joined together along the first and second radius limiting hinge members 18, 20. The first substrate layer 12 can be folded at the first radius limiting hinge member 18 to be disposed overlaying and parallel relative to the second substrate layer 14. In other words, the second substrate layer 14 can be folded over the first substrate layer 12 such that the second substrate layer 14 is parallel to and opposes the first substrate layer 12. The third substrate layer 16 can be folded at the second radius limiting hinge member 20 to be disposed in a parallel, overlying relation relative to the second substrate layer 14.

Figure 2:
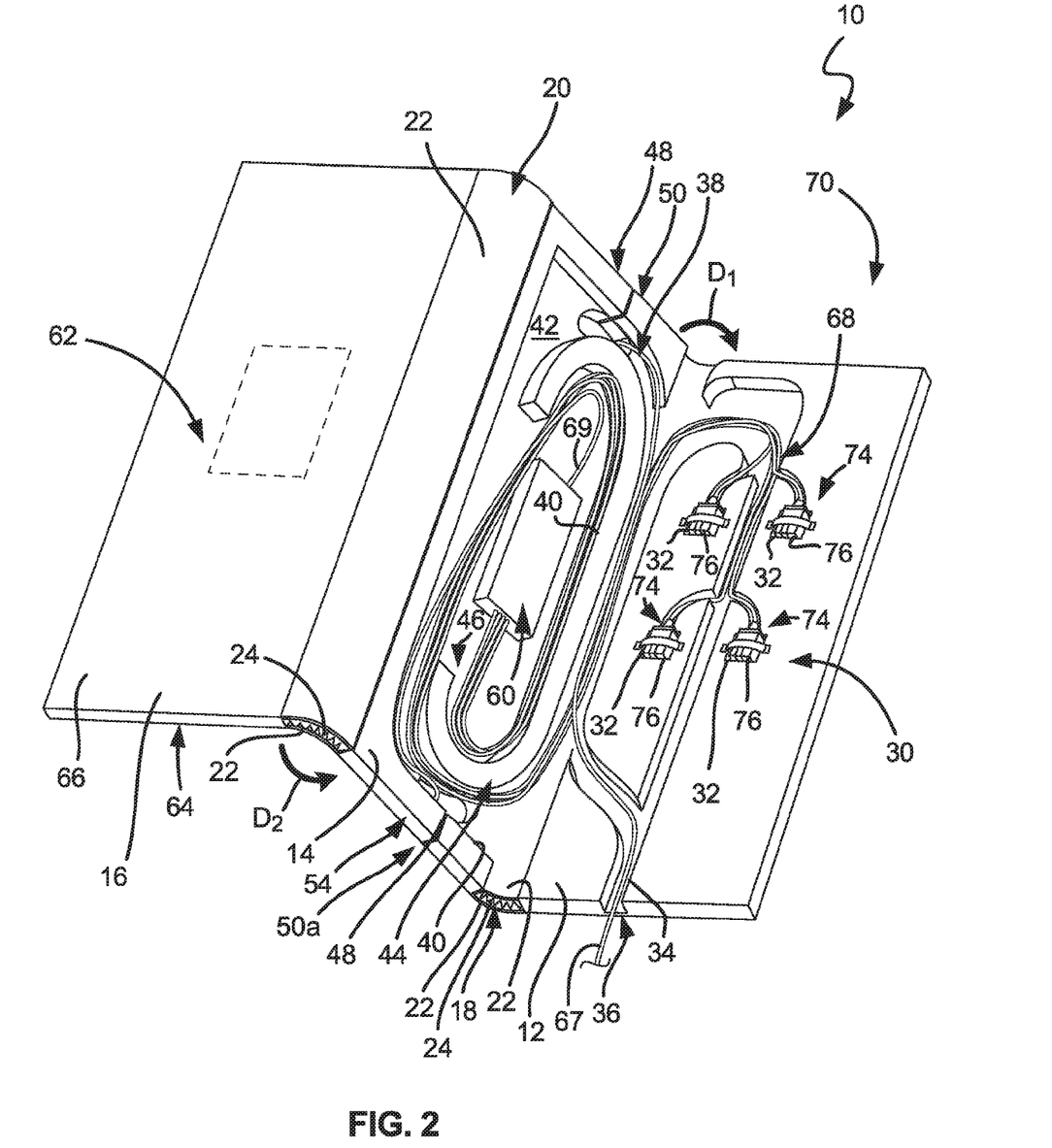
FIG. 2 is a schematic perspective view of the optical fiber management assembly in an expanded state.

Turning to FIG. 2, the optical fiber management assembly 10 is shown in a second state (e.g., open position, unfolded position, expansion configuration). That is, in certain examples, the first, second, third substrate layers 12, 14, 16 may remain in a flat configuration and not be folded along respective first and second radius limiting hinge members 18, 20. The optical fiber management assembly 10 may be arranged and configured to be foldable at the first radius limiting hinge member 18 in a first direction $D_1$ and is configured to be foldable at the second radius limiting hinge member 20 in a second direction $D_2$ that is opposite to the first direction $D_1$.

The first and second radius limiting hinge members 18, 20 may be adapted to move the first, second, and third substrate layers 12, 14, 16 between the first state and the second state. The first and second radius limiting hinge members 18, 20 together allow the first, second, and third substrate layers 12, 14, 16 to be joined together to create a bi-fold configuration similar to a book or pamphlet, although alternative configurations are possible, such as a tri-fold configuration. The first, second, and third substrate layers 12, 14, 16 can be cut out into multiple shapes and/or sizes. The cutting process can be accomplished by any known cutting techniques.

The first substrate layer 12 may include a fiber optic connector storage area 30 that defines at least one opening 32 (e.g., connector portions) for allowing optical fibers to pass therethrough. In certain examples, the optical fibers may be terminated by fiber optic connectors. Fiber optic connectors can be received in the at least one opening 32 of the first substrate layer 12. In certain examples, the at least one opening 32 can be defined in the second or third substrate layers 14, 16, although alternatives are possible.

The fiber optic connectors can be single-fiber optical connectors or multi-fiber optical connectors. Example fiber optic connectors can include SC connectors, LC connectors, FC connectors, FT connectors, ST connectors, and MPO/MTP connectors. The fiber optic connectors can be later plugged into fiber optic adapters. That is, connectorized ends of optical fibers may pass through the at least one opening 32 to plug into non-hardened connector ports of fiber optic adapters, which will be described in more detail with reference to FIG. 3.

Although four openings 32 are depicted, it will be appreciated that any number of openings may be defined in the first substrate layer 12. The first substrate layer 12 may also define a slot 34 having an open end 36. Optical fibers may be routed through the slot 34 such that the optical fibers can be allowed to transfer between the first, second, and third substrate layers 12, 14, 16 from the open end 36.

Still referring to FIG. 2, the second substrate layer 14 includes an optical fiber storage area 38 adapted to allow loose optical fiber to be coiled thereon. For example, the second substrate layer 14 can be configured for loose fiber routing, storage, and/or management. The second substrate layer 14 may include one or more fiber guide walls 40 that project upwardly from a top surface 42 at a top side 44 (e.g., first side, inner side) of the second substrate layer 14. The one or more fiber guide walls 40 may define a fiber routing path 46 on the top side 44 of the second substrate layer 14. In certain examples, one or more fiber routing paths 46 may be defined on the top side 44 of the second substrate layer 14. The second substrate layer 14 may also define slots 48 at a first end 50 and a second end 50a thereof to allow optical fibers to be passed therethrough. It will be appreciated that a variety of routing configurations can be used for routing the optical fiber on the second substrate layer 14. It will be appreciated that any number of optical fibers may be routed on the second substrate layer 14. In certain examples, there may be 12 fibers, 24 fibers, or any other number of fibers routed on the second substrate layer 14. The second substrate layer 14 may be arranged and configured to hold optical fibers in a fixed routing path.

In certain examples, the second substrate layer 14 may include an opposite bottom side 52 (e.g., second side, outer side). When the optical fiber management assembly 10 is in the first state, the first substrate layer 12 can be positioned under the second substrate layer 14 such that the first substrate layer 12 is parallel to and opposes the top side 44 of the second substrate layer 14. The opposite bottom side 52 of the second substrate layer 14 may also include fiber routing paths for routing optical fibers thereon. As such, optical fibers may be routed between the top and bottom sides 44, 52 of the second substrate layer 14.

When the optical fiber management assembly 10 is in the first state, the third substrate layer 16 can be folded at the second radius limiting hinge member 20 to be disposed over the bottom side 52 of the second substrate layer 14 in a parallel, overlying relation relative to the second substrate layer 14.

The optical fibers can run parallel to the first and second radius limiting hinge members 18, 20 between the top and bottom sides 44, 52 of the second substrate layer 14. Fiber guide walls 40 may be arranged and configured adjacent a second end 54 of the second substrate layer 14, although alternatives are possible. In other examples, a slot may be defined at the second end 54 of the second substrate layer 14.

The process of routing optical fiber onto the optical fiber management assembly 10 can be an automated process, although alternatives are possible. In certain examples, the optical fiber can be routed onto the second substrate layer 14 with a needle extending from a robotic arm. That is, to route the fibers on the second substrate layer 14, in some examples the fiber can be laid on the second substrate layer 14 by being passed through a needle controlled by robotics, the robotics being configured to route the fiber along a predefined path on the second substrate layer 14. The robotics can be configured to route the fiber in a single plane or across multiple planes; similarly, separate fibers can be routed in the same or different plane(s) of the substrate as other fibers.

In certain examples, as the robotics route the optical fibers, the needle can be configured to press the optical fibers onto an adhesive layer that has been pre-applied to the second substrate layer 14. In some examples, the fiber is dispensed from a spool and a cutting device disposed at or near the needle end is configured to cut a length of fiber after it has been laid on the second substrate layer 14 so that the next length of fiber can be laid. It will be appreciated that a variety of optical fiber routing configurations can be arranged on the second substrate layer 14. The paths and lengths of the individually routed fibers can vary from fiber to fiber.

A cutting tool (e.g., a blade, or other cutting tool) may be used to make cuts or incisions in the optical fiber management assembly 10 to create a fiber management/routing tab, retainer, lip, finger, etc. to manage loose/unattached optical fibers. It will be appreciated that various shapes may be formed in the optical fiber management assembly 10 by a cutting tool (not shown) for managing optical fibers. That is, optical fiber can be routed under and inside a fiber management/routing tab, retainer, lip, finger, etc. such that lengths of optical fibers may be loosely constrained or stored on at least one of the first, second, and third substrate layers 12, 14, 16 to help prevent displacement of the optical fiber. The optical fibers may be bent or coiled or wrapped at an appropriate bend radius for the optical fiber. Any excess fiber length may be stored in loops. The optical fiber may be routed parallel along the first and second radius limiting hinge members 18, 20 such that no kinks or bends develop along the route during folding of the first, second, and third substrate layers 12, 14, 16. Example methods whereby optical fibers may be secured on this type of substrate are disclosed by International PCT Application No. PCT/US2019/025869, filed Apr. 4, 2019, which application is hereby incorporated by reference in its entirety.

A plurality of optical fibers can be routed through respective channels 26, 28 formed by the first and second radius limiting hinge members 18, 20 of the optical fiber management assembly 10.

Of course, in alternative embodiments, the optical fiber management assembly 10 can comprise other structural elements, to manage optical fibers, as would be apparent to one of ordinary skill.

Still referring to FIG. 2, the third substrate layer 16 may include a pre-fibered layer made in a production facility and may be used in the field for further assembly with other elements. For example, the third substrate layer 16 can provide optionally provide splice mounting capability for the capability of supporting splicing in the field.

Figure 6:
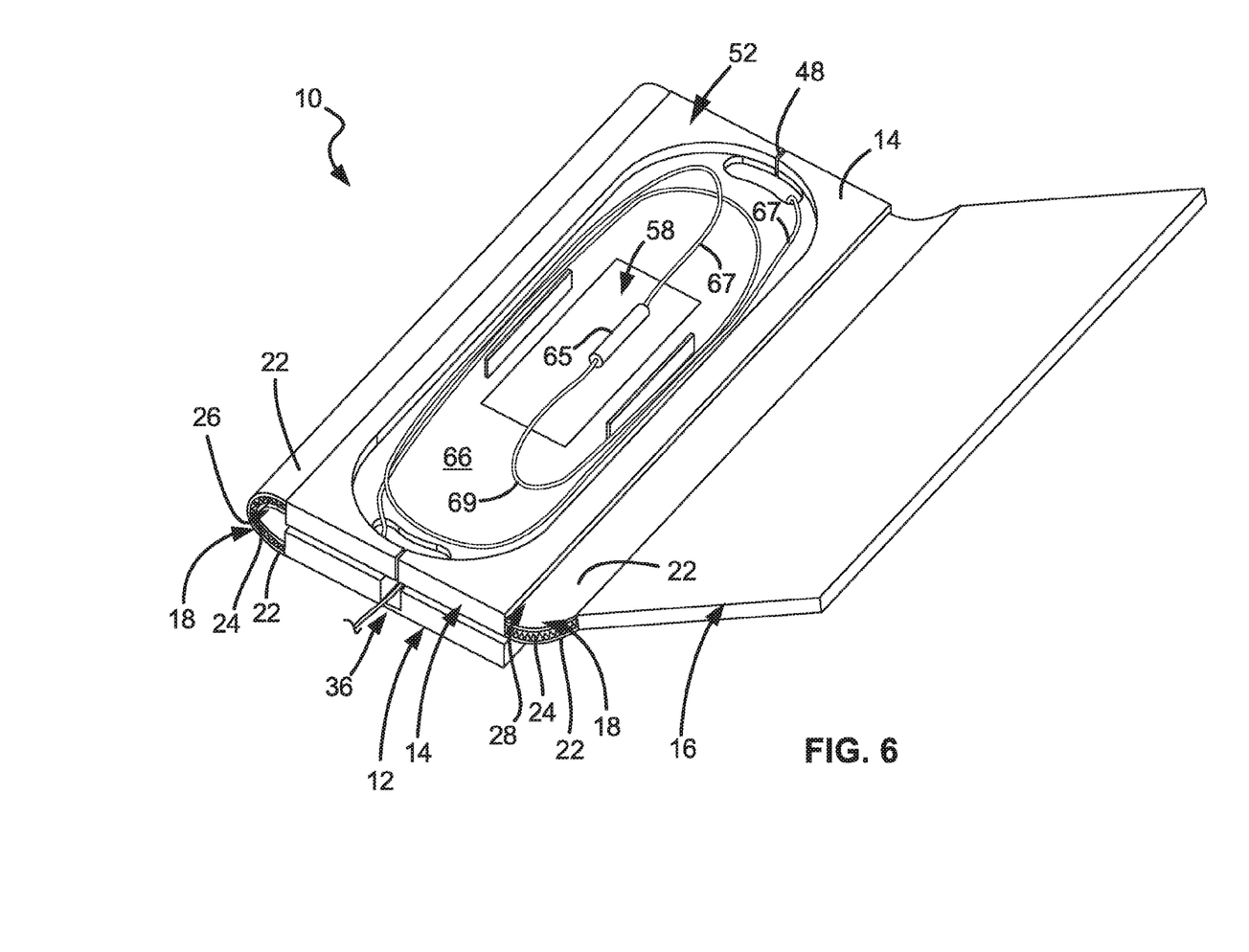
FIG. 6 is a perspective view of the optical fiber management assembly of FIG. 2 showing a splice tray.

Referring to FIG. 6, routed optical fibers may include excess fiber length that can be stored (e.g., in a coiled configuration) for use in later optical splicing. A portion of the optical fiber routed and managed can be routed to an optical splice sleeve storage area 58. In one example, the optical splice location 58 can be positioned on the bottom side 52 of the second substrate layer 14. In certain examples, an optical fiber may be routed to an optical component 60 (e.g., splitter, tap, etc.). In one example, the optical component 60 can be positioned at the top side 44 of the second substrate layer 14. Optical fibers can be secured together at the splice location 58. It will be appreciated that the third substrate layer 16 may include a front side 62 (e.g., first side, top side, outer side) and opposite rear side 64 (e.g., second side, bottom side, inner side). As such, both the front and rear sides 62, 64 of the third substrate layer 16 may be functional.

The splice location 58 can be defined by a splice tray 66 (e.g., splice holder) in the bottom side 52 of the second substrate layer 14. A splice sleeve 65 can be used to secure and protect optical fiber splices stored in the optical splice sleeve storage area 58. In some examples, a plastic material may be used to contain and protect optical fibers spliced on the optical fiber management assembly 10. While in the field, there may be a need to splice an optical fiber to another fiber on the second substrate layer 14. The splice can be a mechanical splice or a fusion splice. For example, a fiber 67 from an input cable can be routed from the first substrate layer 12 onto the splice tray 66 and an input optical fiber 69 of the optical component 60 may be routed onto the splice tray 66 to be spliced to the stub fiber 67. When optical fibers are spliced together, a certain amount of length of the optical fibers can be stored on the splice tray 66 of the second substrate layer 14.

Optical fibers 68 from the optical component 60 can be routed onto the first substrate layer 12. In certain examples, the optical fibers 68 may be a bare fiber, although alternatives are possible. In certain examples, the optical fibers may be upjacketed, although alternatives are possible. In certain examples, the optical fibers may be coated, although alternatives are possible.

Figure 3:
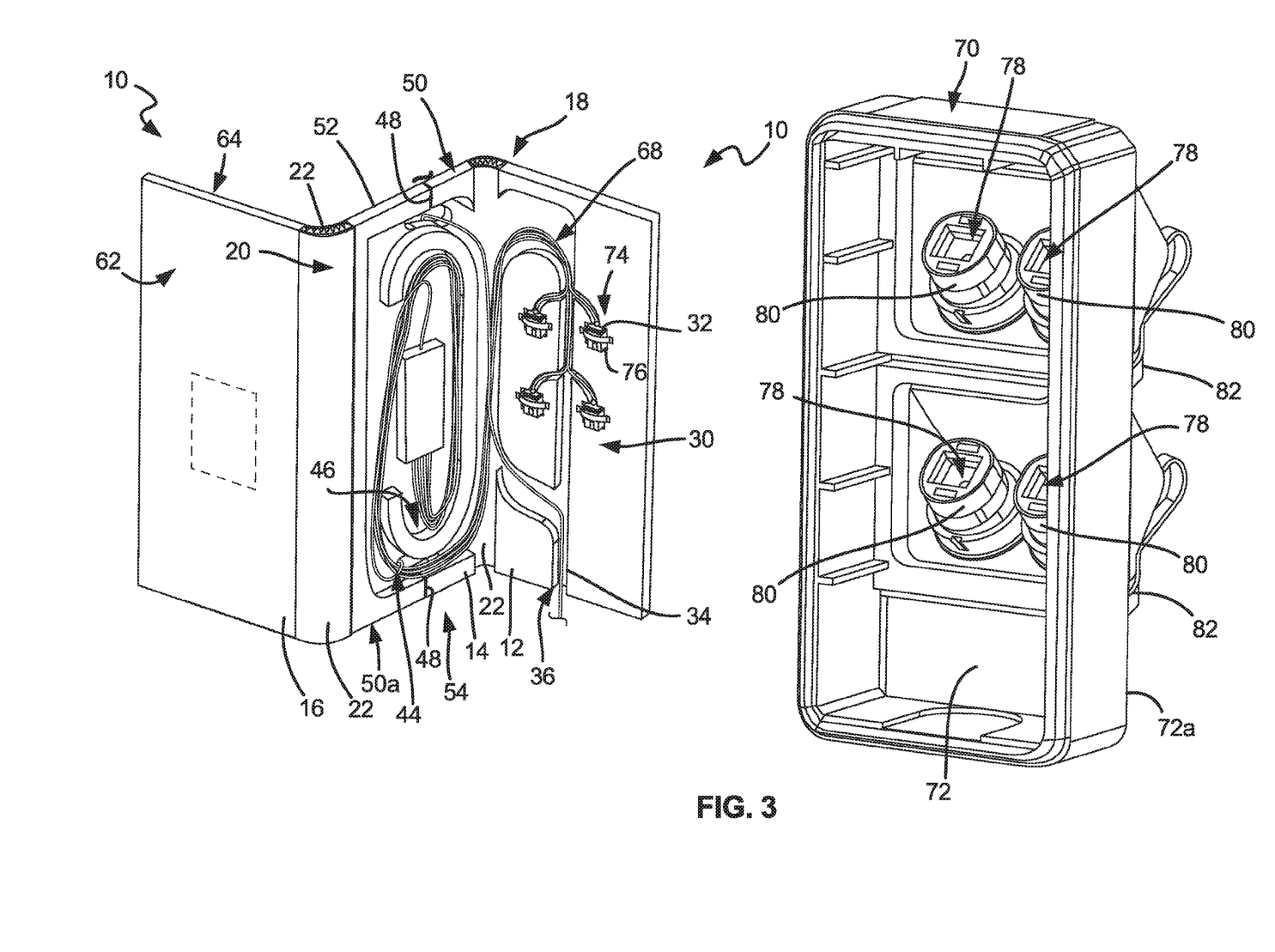
FIG. 3 is a schematic perspective view of the optical fiber management assembly of FIG. 2 prior to insertion into an example enclosure housing piece.

Turning to FIG. 3, the optical fiber management assembly 10 can be adapted for use with a telecommunications enclosure 70 (e.g., closure, organizer, or other telecommunications equipment). The telecommunications enclosure 70 can include a housing 72. The housing 72 may have a first housing piece 72a (e.g., cover, top) and a second housing piece (e.g., base, bottom) (not shown).

As described above, optical fibers 68 can have connectorized ends 74 (see FIG. 2). That is, the optical fibers 68 may each be terminated by a fiber optic connector 76. The connectorized ends 74 can plug into non-hardened connector ports 78 of fiber optic adapters 80 that are secured to the first housing piece 72a of the telecommunications enclosure 70.

In certain examples, the optical fibers 68 can pass through the at least one opening 32 of the first substrate layer 12 to reach the non-hardened connector ports 78. In certain examples, connectorized ends 74 of spliced optical fibers 68 can be respectively routed through the at least one opening 32 of the first substrate layer 12 to plug into the non-hardened connector ports 78 of fiber optic adapters 80.

In certain examples, the fiber optic adapters 80 are ruggedized fiber optic adapters that include hardened connector ports 82 accessible from outside the first housing piece 72a and the non-hardened connector ports 78 accessible from inside the housing 72.

In certain examples, the optical fiber management assembly 10 may be assembled with splitters, WDM's and optical fiber pigtails with connectors that are routed and stored thereon as a final product to be mounted or placed in the telecommunications enclosure 70. As such, separate trays may not be needed in an enclosure or organizer. The optical fiber management assembly 10 can have features that allow connection with other structures. An optical fiber may be pre-spliced to a feed cable and stored on the optical fiber management assembly 10 before the optical fiber management assembly 10 is dropped or positioned within the telecommunications enclosure 70. Because all of the splicing can be done beforehand, the process can be more efficient.

Figure 4:
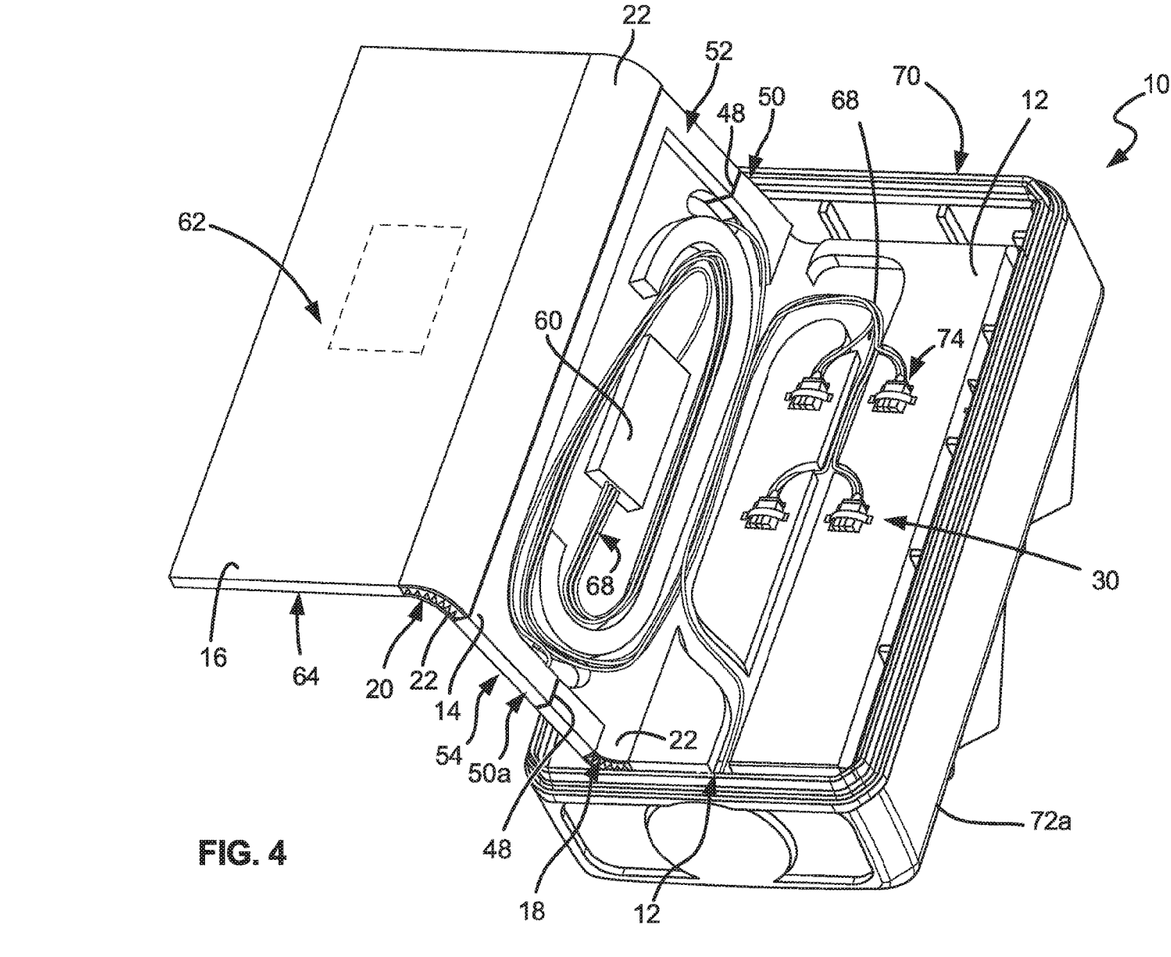
FIG. 4 is a top, schematic view of the optical fiber management assembly in the expanded state with a first panel positioned within the enclosure housing piece of FIG. 3.
Figure 5:
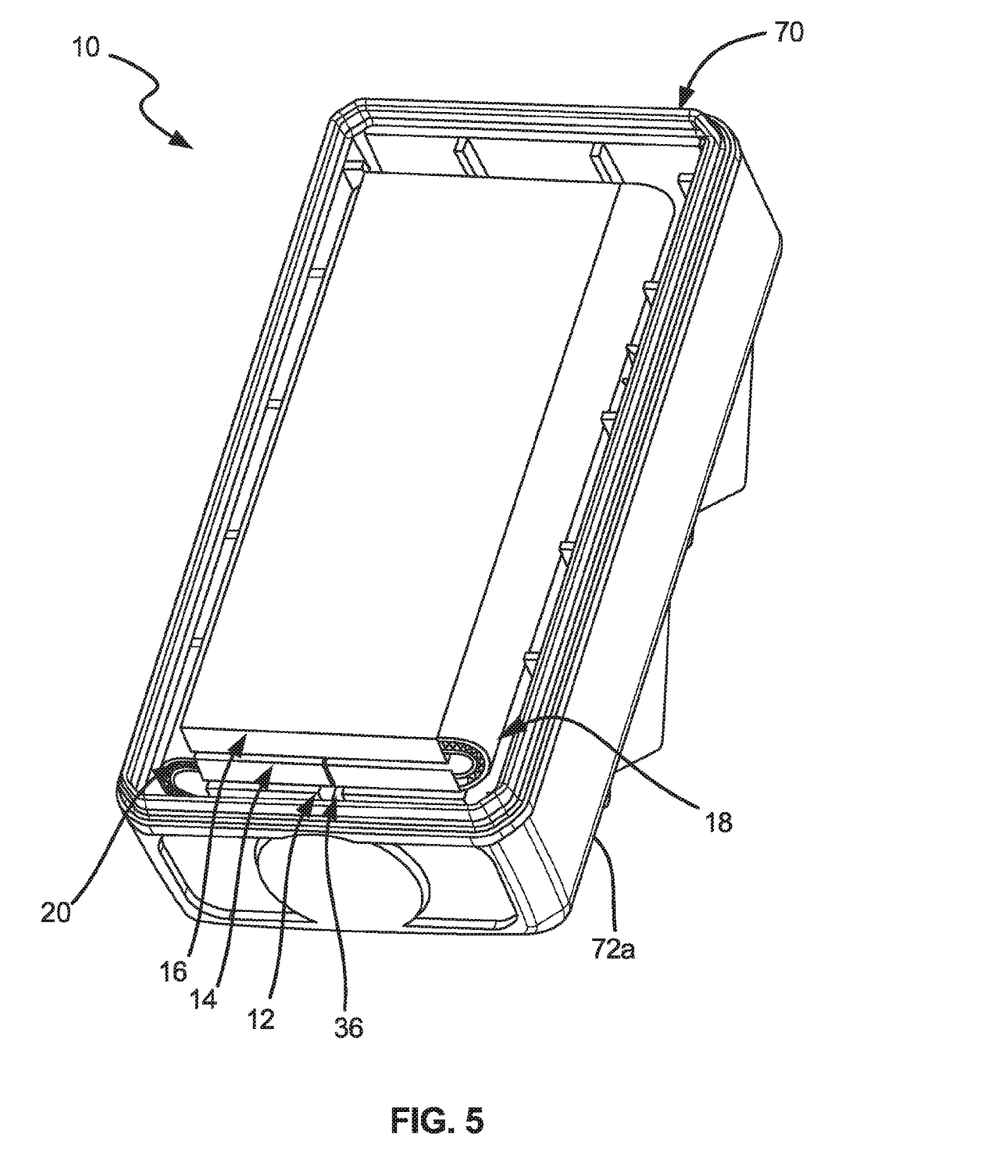
FIG. 5 is a perspective, schematic view of the optical fiber management assembly of FIG. 2 in the collapsed state positioned within the enclosure housing piece of FIG. 3.

Turning to FIGS. 4 and 5, the optical fiber management assembly 10 can be movable between the second state (see FIG. 4) in which the first, second, and third substrate layers 12, 14, 16 are generally planar and the first state (see FIG. 5) in which the first, second, and third substrate layers 12, 14, 16 generally oppose one another. When the optical fiber management assembly 10 is mounted within the telecommunications enclosure 70, the optical fiber management assembly 10 is oriented in the first state. That is, the first, second, and third substrate layers 12, 14, 16 can be mountable in the housing 72 and be oriented in the first state when in the housing 72. In certain examples, the first, second, and third substrate layers 12, 14, 16 may be oriented in the first state where a gentle bend (e.g., gentle curve, rolled, not folded) (see FIG. 5) of the first, second, and third substrate layers 12, 14, 16 are obtained to provide bend radius protection for the optical fibers 68. The first, second, and third substrate layers 12, 14, 16 can be bent or flexed about the first and second radius limiting hinge members 18, 20 to support the optical fibers 68 without creating a fold.

From the forgoing detailed description, it will be evident that modifications and variations can be made without departing from the spirit and scope of the disclosure.

What is claimed is:

1. A telecommunications enclosure comprising:
    (a) a housing;
    (b) a plurality of ruggedized fiber optic adapters secured to the housing, the ruggedized fiber optic adapters including hardened connector ports accessible from outside the housing and non-hardened connector ports accessible from inside the housing;
    (c) an optical fiber management assembly including a plurality of panels and at least one hinge location disposed between the plurality of panels, wherein the optical fiber management assembly is configured to be foldable at the at least one hinge location; and
    (d) optical fibers being supported on at least one of the plurality of panels;
    wherein the at least one hinge location is adapted to move each of the plurality of panels between a first state and a second state, wherein a first panel of the plurality of panels includes a fiber optic connector storage area.

2. The telecommunications enclosure of claim 1, wherein the first state is a compact configuration, and the second state is an expansion configuration.

3. The telecommunications enclosure of claim 1, wherein the optical fiber management assembly is adapted for use with the enclosure and is oriented in the first state when within the enclosure.

4. The telecommunications enclosure of claim 1, wherein the first panel defines at least one opening for allowing the optical fibers to pass therethrough.

5. The telecommunications enclosure of claim 1, wherein the first panel defines a slot having an open end.

6. The telecommunications enclosure of claim 1, wherein a second panel of the plurality of panels includes an optical fiber storage area adapted to allow loosely constrained optical fibers to be coiled thereon.

7. The telecommunications enclosure of claim 6, wherein the second panel includes fiber guide walls that project upwardly from a top surface at a top side of the second panel, the fiber guide walls defining a fiber routing path on the top side of the second panel.

8. The telecommunications enclosure of claim 6, wherein the second panel defines a slot at first and second ends thereof.

9. The telecommunications enclosure of claim 6 wherein when the optical fiber management assembly is in the first state, a first top surface of the first panel faces a second top surface of the second panel, and a third top surface of a third panel faces a bottom surface of the second panel.

10. The telecommunications enclosure of claim 6 wherein the second panel includes a splice storage area.

11. The telecommunications enclosure of claim 6, wherein first and second optical fibers are secured together at a splice location on the second panel.

12. The telecommunications enclosure of claim 11, wherein the splice location is supported by a splice tray, and wherein the splice tray is positioned on a bottom side of the second panel.

13. The telecommunications enclosure of claim 12, wherein an optical component is positioned on a top side of the second panel.

14. The telecommunications enclosure of claim 1, wherein when the optical fiber management assembly is positioned within the enclosure, connectorized ends of the optical fibers pass through at least one opening of the first panel to plug into the non-hardened connector ports of the fiber optic adapters.

15. The telecommunications enclosure of claim 1, wherein the at least one hinge location includes a first hinge location and a second hinge location, and wherein the optical fibers are routed parallel to at least one of the first hinge location and the second hinge location.

16. The telecommunications enclosure of claim 15, wherein the optical fiber management assembly is configured to be foldable at the first hinge location in a first direction and is configured to be foldable at the second hinge location in a second direction that is opposite to the first direction.

17. The telecommunications enclosure of claim 1, wherein each panel of the plurality of panels comprise a foam material.

18. The telecommunications enclosure of claim 1, wherein the at least one hinge includes opposing film layers and strips sandwiched between the opposing film layers, wherein the at least one hinge is a flexible hinge connecting at least the first panel and a second panel.

19. The telecommunications enclosure of claim 18, wherein the at least one hinge joins the first and second panels as a unitary piece without gaps and is configured to prevent pinching of fibers when moved between the first state and the second state.

* * * * *